UNITED STATES PATENT OFFICE

ERWIN HOFFA AND HANS HEYNA, OF HOCHST-ON-MAIN, GERMANY, ASSIGNORS TO GENERAL ANILINE WORKS, INC., OF NEW YORK, N. Y., A CORPORATION OF DELAWARE

NEW VAT DYESTUFFS AND A PROCESS OF PREPARING THEM

No Drawing. Application filed October 13, 1927, Serial No. 226,039, and in Germany October 23, 1926.

The present invention relates to new vat-dyestuffs and a process of preparing them.

Our invention is based on the discovery that such dyestuffs as contain the group:

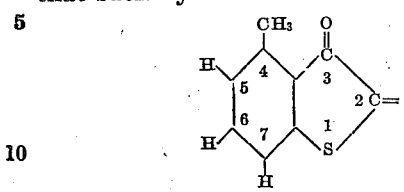

for instance the 4.4'-dimethyl-thioindigo, surpasses by far as regards their fastness to light the known higher substituted thioindigo dyestuffs methylated in 4-position and meet in this respect the highest requirements.

The 4-methyl-hydroxythionaphthene can be prepared by treating a compound of the following formula:

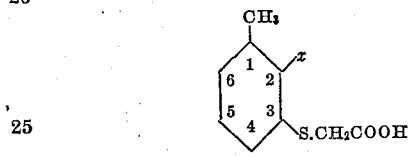

wherein $x$ stands for CN, CONH$_2$ or COOH with an agent capable of closing the ring. The hydroxythionaphthene is transformed into the corresponding thioindigo dyestuff by oxidizing it according to the usual methods.

The following examples serve to illustrate our invention, but they are not intended to limit it thereto; the parts being parts by weight:—

1. 21 parts of 3-methylbenzene-1-thioglycol-2-carboxylic acid nitrile are dissolved in 600 parts of water and 10 parts of caustic soda solution of 40° Bé. When dissolution is complete, there are added 90 parts of caustic soda solution of 40° Bé and the whole is stirred for 2 hours at 80 to 85° C. The separation of the sodium salt of 4-methyl-3-amino-1-thionaphthene-2-carboxylic acid begins already when the solution is heated, and after addition of 50 parts of sodium chloride it is nearly complete when the solution has cooled. The sodium salt is filtered and washed with a solution of sodium chloride; the moist paste is dissolved in 20 times its weight of water while adding small quantities of caustic soda solution and sodium bisulfite. The product is filtered, the filtrate is acidified with dilute sulfuric acid and then heated on the water bath until the formation of hydroxythionaphthene is complete. After cooling, the hydroxythionaphthene is filtered by suction, washed and transformed into the 4.4'-dimethylbisthionaphthene-indigo according to known methods.

The said dyestuff gives a golden-yellow vat which dyes cotton very clear red tints of extraordinary good fastness to light.

The parent body can be made by substituting cyanogen in the 1-methyl-2-amino-3-nitrobenzene for the amino-group, reducing the nitro-group to the amino-group and introducing the thioglycollic acid residue by way of the diazo-compound.

2. 15 parts of 3-methylbenzene-1-thioglycol-2-carboxylic acid are melted with 150 parts of caustic soda and 20 parts of water for 1 hour at 180 to 200° C. After cooling, the mass is dissolved in 500 parts of water, filtered and the filtrate is oxidized to the dyestuff in the usual manner. The dyestuff is identical with that obtainable according to Example 1.

The parent material can be made by transforming 1-methyl-2-amino-3-chlorobenzene by way of the diazo-compound into the cyanogen compound, saponifying the cyanogen group to the carboxyl group and substituting for the chlorine the residue $-S-CH_2-COOH$, for instance by the process described in German Patent No. 189,200.

3. 32 parts of 4-methyl-6-chlor-2.3-dihydro-3-ketothionaphthene-2-(4'-dimethylamino)-anile of the formula:

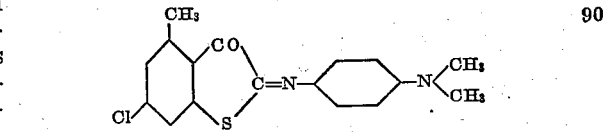

are heated to boiling with 16 parts of 4-methyl-3-hydroxy-thionaphthene in 600 parts of glacial acetic acid until the formation of the dyestuff is complete. After cooling, the dyestuff is filtered by suction and washed until neutral. It dyes cotton red tints of goods fastness to boiling and to light. When dissolved in sulfuric acid, it gives a bluish-green solution.

4. 21 parts of 5.7-dichlorisatine are heated in 200 parts of benzene with 21 parts of phosphorus pentachloride until the whole is dissolved and to the mass is then added a suspension of 16 parts of 4-methyl-3-hydroxy-thionaphthene in 100 parts of benzene, while well stirring. The separation of the dyestuff begins very soon. When it is complete, the dyestuff is isolated from the benzene. It dyes cotton a violet shade of excellent fastness to boiling and light. Its solution in sulfuric acid is of a green color.

We claim:

1. As new products, indigoid vat-dyestuffs containing the following atomic group:

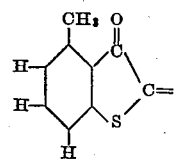

which dyestuffs possess excellent properties regarding fastness.

2. As new products, the vat-dyestuffs of the following formula:

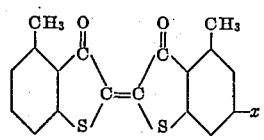

wherein $x$ stands for hydrogen or a halogen atom which vat-dyestuffs possess excellent properties regarding fastness.

3. As a new product, the vat-dyestuff of the following formula:

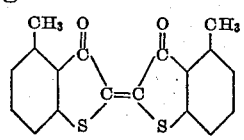

which dyestuff dissolves into a vat with a golden-yellow color and gives on cotton very clear red shades remarkable for their extraordinary goods fastness to light.

In testimony whereof, we affix our signatures.

ERWIN HOFFA.
HANS HEYNA.